Oct. 6, 1970  J. A. PENNUCCI  3,531,980
METHOD AND APPARATUS FOR MEASURING VOLATILE CONTENT
Filed April 14, 1967  2 Sheets-Sheet 1
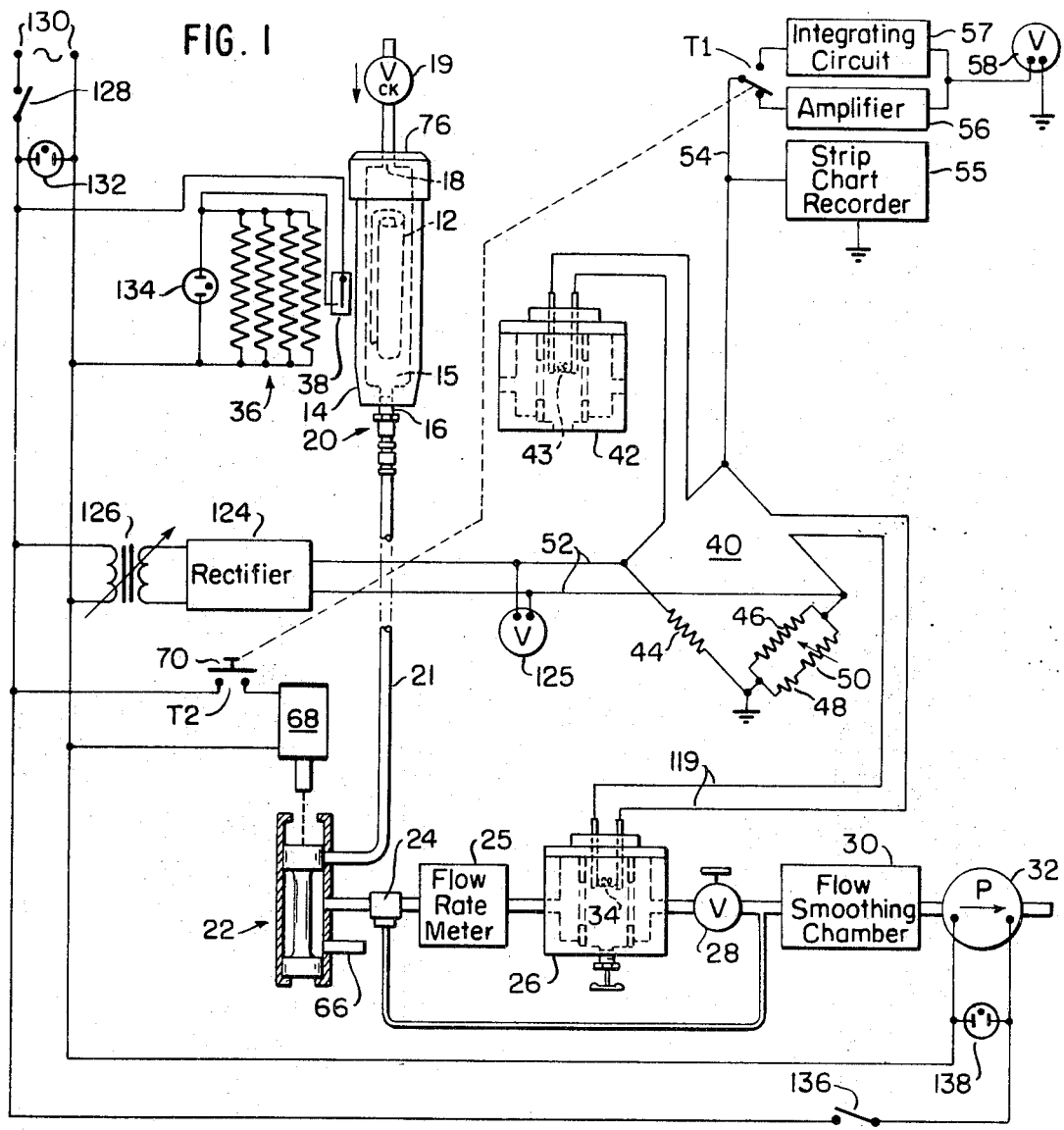
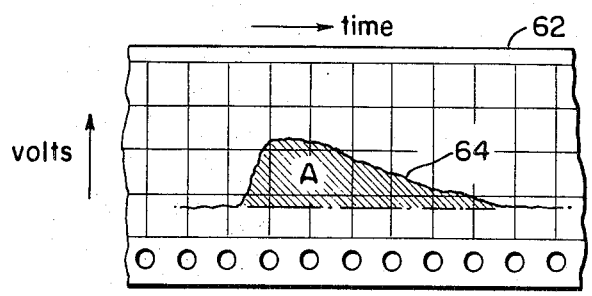
FIG. 2
INVENTOR.
JOHN A. PENNUCCI
BY Kenway, Jenney & Hildreth
ATTORNEYS Oct. 6, 1970 J. A. PENNUCCI 3,531,980
METHOD AND APPARATUS FOR MEASURING VOLATILE CONTENT
Filed April 14, 1967 2 Sheets-Sheet 2

INVENTOR.
JOHN A. PENNUCCI
BY Kenway, Jenney &
Hildreth
ATTORNEYS

United States Patent Office 3,531,980
Patented Oct. 6, 1970

3,531,980
METHOD AND APPARATUS FOR MEASURING VOLATILE CONTENT
John A. Pennucci, Nashua, N.H., assignor to Nashua Corporation, Nashua, N.H., a corporation of Delaware
Filed Apr. 14, 1967, Ser. No. 630,860
Int. Cl. G01n 25/22
U.S. Cl. 73—19      2 Claims

ABSTRACT OF THE DISCLOSURE

A testing instrument provides data for measurement of the volume of residual combustible volatiles in a sample by a process involving evaporation in a sample chamber and conduction to a heated filament by which they are burned. The heat produced by combustion elevates the temperature of the filament which has a temperature variable resistance and comprises one arm of a Wheatstone bridge. The voltage across the bridge is integrated over the period of burning or plotted against time, and the integral or area under the resulting curve corresponds to the volume to be measured.

BACKGROUND OF THE INVENTION

The field of this invention comprises methods and instruments for measuring the quantity of combustible volatiles in material samples by the steps of evaporation, extraction and combustion. Means are associated with the instrument to facilitate the time integration of a function related to the rise in temperature in the region of the burning volatiles.

The invention is particularly useful in production control for measuring the solvent content of coated paper and other web materials during continuous coating operations, although other uses will become apparent. One example is the continuous coating of a web of paper, the coating material including a volatile solvent base such as toluene. It is necessary to provide continuous drying, for which purpose drying rolls and air blowers are typically provided. If the web is rolled up with an excessive solvent residue it will have undesirable properties such as tackiness, odor and poor coating adhesion and the acceptable maximum residue is typically small, for example 5 microliters or even less in a sample having an area measuring nine inches by twelve inches. The weight of toluene corresponding to this volume is only about .0043 gram.

Conventional techniques such as comparative weight measurements using a standard sheet, or measuring a sample sheet before and after desiccation, are totally inadequate. These techniques require excessive time for use in production control and are very inaccurate when employed for measuring small volumes of volatiles. Moreover, they are inconvenient, erratic, expensive and unreliable when used for measuring samples of large size.

SUMMARY

This invention provides solutions to the foregoing difficulties by means of an extremely sensitive method and instrument that may be used reliably to measure very small samples of volatile containing materials, the instrument being readily calibrated and thereafter remaining consistent in performance. The instrument also produces usable results within a very short time, thus providing a basis for prompt adjustment of coating operation parameters including web speed, roll or oven temperatures and other production variables.

An important feature of the invention is the burning of the volatiles extracted from a sample of predetermined size as they are conducted through a flow passage at a carefully controlled rate. This step is accompanied by the measurement of the resulting rise in the temperature and conversion thereof to a corresponding electrical signal by use of a temperature variable resistance. The resistance variation provides a very sensitive measure of the concentration of volatiles, and it is only necessary to integrate a voltage produced by the resistance change over the period of time during which the volatiles in the sample are being burned. This integral may then be compared with that for a known quantity of volatiles used as a reference for calibration of the instrument.

BRIEF DESCRIPTION OF THE DRAWING

FIG. 1 is a schematic drawing of the principal pneumatic and electrical parts of the preferred embodiment of the invention including the related indicating and recording circuits.

FIG. 2 is a fragmentary view of a strip chart produced by the instrument of FIG. 1.

DESCRIPTION OF THE PREFERRED EMBODIMENT

Figure 4:
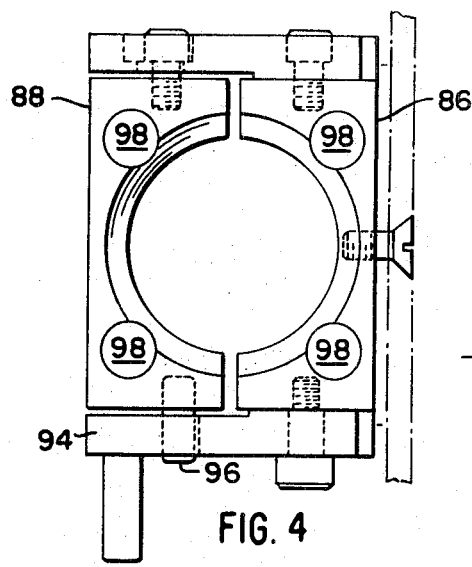
FIG. 4 is a plan view corresponding to FIG. 3.
Figure 6:
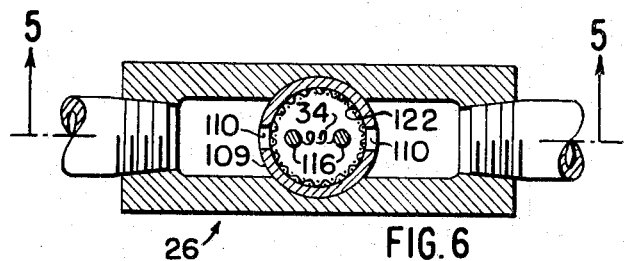
FIG. 6 is a view in section taken on line 6—6 of FIG. 5.

Referring to FIG. 1, a typical specimen or sample to be measured consists of a sheet of combustible solvent bearing coated paper 12 of accurately measured area, for example nine inches by twelve inches in dimension or smaller. The sample is placed in a heated capsule 14 defining a sample chamber 15 and connected with a passage 16. During a test, atmospheric air is admitted at a steady, controlled rate through an opening 18 in the chamber and a check valve 19 which opens only when the atmospheric pressure exceeds that in the chamber. This air is drawn into the passage 16, through a valved quick release fitting 20, a passage 21, a three-way valve 22, a differential pressure controller 24, a flow rate meter 25, a measuring chamber 26, a flow control needle valve 28, a flow smoothing chamber 30 and a vacuum pump 32, from which it is expelled to the atmosphere.

Within the measuring chamber 26, there is a filament 34 that is heated by an electrical current as described below. The volatiles borne by the flowing air pass over the filament 34 and are burned on or near its surface. To accelerate the burning process, four strip heaters 36 are preferably fitted around the capsule 14 to evaporate the volatiles. An adjustable thermostatic control switch 38 is associated with a thermocouple tip situated in proximity to the capsule 14, accurately controlling its temperature. Thereby, substantially all of the solvents are evaporated from the sample 12 within a short time. preferably less than five minutes.

The filament 34 has a temperature variable resistance and comprises on leg of a Wheatstone bridge designated generally at 40. Another leg of this bridge comprises a reference chamber 42 having a filament 43, which are identical to the chamber 26 and filament 34 but without connections to the flow passages described above. The remainder of the bridge comprises fixed resistances 44, 46 and 48 and a variable resistance 50 used as a balance control as described below.

Leads 52 supply a direct current voltage to the bridge 40 and the output of the bridge is measured between ground and a connection 54 leading to a strip chart recorder 55, an amplifier 56 and an integrating circuit 57. A voltmeter 58 is connected for operation by either the integrating circuit 57 or the amplifier 56 depending on the position of contacts T1 as hereinafter described, such contacts forming part of a "test-balance"

control. In the "balance" position as shown, the meter 58 registers the amplified voltage across the bridge, and in the actuated or "test" position it registers the time integral of the voltage for the interval in which the contacts T1 are held in that position.

The recorder 55 is of any suitable form and has a constant speed paper drive. It plots the voltage across the bridge as a function of time upon a strip chart 62 (FIG. 2). When volatiles are burning on the filament 34 a curve 64 results. The area A under the curve corresponds to the volume of volatiles extracted from the sample 12 as determined by calibration measurements hereinafter described. The conditions of the test are carefully controlled, particularly as to the temperature within the sample chamber 15, the rate of flow through the flow rate meter 25, the pressure differential between the controller 24 and the outlet of the valve 28, and the voltage supplied to the leads 52.

In order to stabilize conditions within the above-described flow path throughout the test a preliminary flow path is established by the three-way valve 22 before the test is started, as shown. Atmospheric air is admitted to the controller 24 from an open orifice 66, the sample chamber 15 being disconnected from the controller by the same valve. The differential pressure controller 24 is adjusted so that it automatically establishes and maintains a fixed differential between the inlet of the flow rate meter 25 and the outlet of the needle valve 28. Also, the valve 28 is adjusted to bring the flow rate meter 25 to a predetermined reading established as the proper value for the conditions of the test. After these adjustments the sample 12 is inserted in the chamber 15, the chamber is heated to evaporate the volatiles, the valve 22 is operated to shut off the connection to the orifice 66, and atmospheric air is admitted to the flow path through the check valve 19, sweeping the solvent vapors through the measuring chamber. Preferably, the valve 22 is operated by a solenoid 68 which is energized by pushing a momentary type push button 70 having contacts T1 and T2, the pushbutton being normally biased to the "balance" position shown and serving as the "test-balance" control for the instrument.

The foregoing transfer of the air flow from the orifice 66 to the opening 18 is preferably accomplished with a minimum fluctuation in the flow rate as measured by the meter 25. To this end, the controller 24 continues to maintain a constant pressure differential, and if desired, a needle valve may be inserted in the connection 16 for adjustment to control the flow rate.

Figure 3:
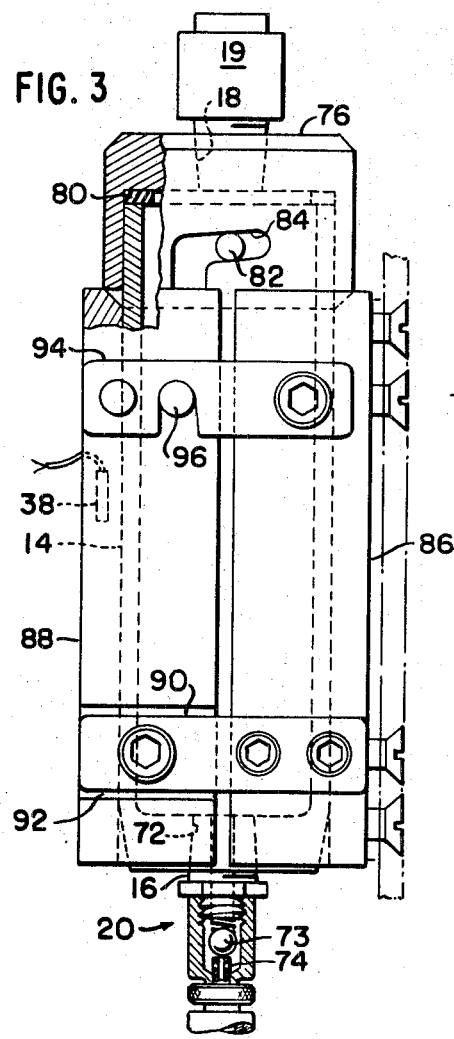
FIG. 3 is a side elevation partly in section, of the sample chamber and heater blocks.

The structure of the sample capsule 14 and related parts is next described in connection with FIGS. 3 and 4. The capsule is a cylindrical metal tube having a threaded outlet 72 to which the quick release fitting 20 is attached. The fitting is preferably of the type having a spring-loaded ball 72 that seats to close the outlet when the capsule is removed from the fitting, and is unseated as shown by a stem 74 to open the flow path when engaged with the fitting. The fitting is sold commercially under the name "Crawford Swage Lock Quick Disconnect."

The top of the chamber is fitted with a metal cover 76 having the axial threaded opening 18. The cover is fitted with a gasket 80 and held in place by three equally spaced dowels 82 received in pitched, open-ended slots 84.

The capsule 14 fits within a cradle formed by two slightly spaced apart metal heater blocks 86 and 88 each having a semi-cylindrical interior surface. The blocks are held together by two lower links 90, fitting in somewhat wider flats 92 machined on the blocks, and two pivotal upper links 94 serving as latches engageable with dowels 96. In placing the sample capsule into the blocks, the latch links 94 are first lifted and the blocks 86 and 88 are pivotally separated a small distance as afforded by the freedom of movement within the flats 92. The capsule 14 is then inserted, and the latches 94 are secured to form a snug contact between the blocks and the capsule.

Each of the blocks has two longitudinal cylindrical bores 98 within which are received the strip heaters 36. The blocks 86 and 88 are preferably made of aluminum to facilitate the transfer of heat from the heaters to the sample capsule.

The thermostatic control 38 is preferably placed inside the heater blocks 86 and 88 near the capsule. This control is preferably provided with suitable means of adjustment to hold the temperature within the sample chamber 15 at a steady value sufficient to vaporize rapidly the voltailes in the sample to be measured.

Figure 5:
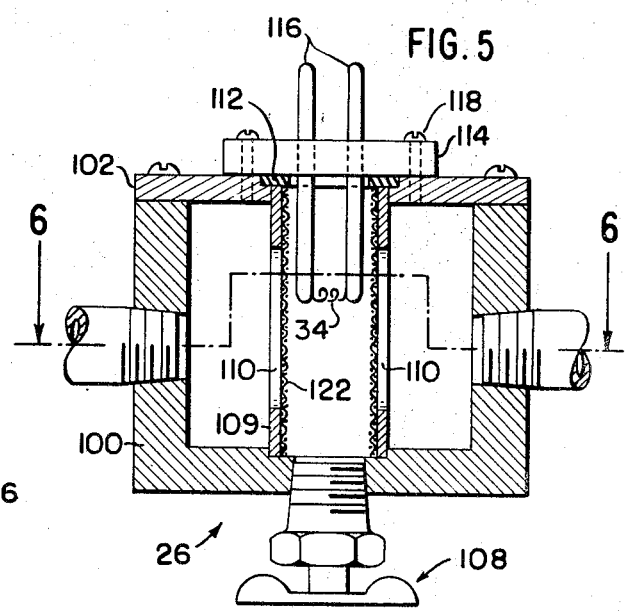
FIG. 5 is an elevation in section of the measuring chamber.

The measuring and reference chambers 26 and 42 are preferably identical in construction as shown in FIG. 5. the chamber comprises a machined metal shell 100 having a closed end and fitted with a metal cover 102. The chamber has threaded openings to receive the passage tubes and also a drain cock 108. A cylindrical metal sleeve 109 having elongated slots 110 is fitted within the chamber and held in place by a gasket 112. A rectangular insulating piece 114 supports a pair of metal prongs 116 and is secured to the cover 102 against the gasket 112 by screws 118. Between the prongs 116 is secured the filament 34. The prongs 116 are externally connected by wires 119 to the bridge 40 as shown in FIG. 1.

The drain cock 108 is fitted to the chamber in communication with the space inside the sleeve 109. This cock is used to drain off water which accumulates within the filament chamber as a product of combustion of many of the volatiles that may be measured in this apparatus.

A wire gauze screen 122 is preferably fitted within the sleeve 109. The screen facilitates collection of the water, and also prevents any solid particles entrained in the air stream from striking the filament 34.

The filament 34 is normally connected to a source of direct current and heated to a point above the flash point of the volatiles to be measured. This current is supplied to the bridge 40 through the wires 52 by a rectifier 124 connected with an alternating current source through a variable transformer 126. The voltage is shown by a voltmeter 125.

The burning of the volatiles takes place almost entirely at the surface of the filament 34, and as previously stated this filament has a temperature variable resistance which affects the balance of the bridge 40 in a manner more fully described below.

In operation, the first step is to establish uniform temperature and flow conditions in the sample chamber and in the measuring and reference chambers. With the empty capsule 14 covered and latched in place, a main power switch 128 is closed to connect the apparatus with a source of alternating current supplied across terminals 130. A pilot lamp 132 indicates that the apparatus is in operation. At the same time the heater rods 36 and an indicator lamp 134, all under control of the thermostat switch 38, are energized. Electrical power is also supplied to the transformer 126, causing the supply of direct current to the bridge 40. Direct current is also thereby supplied to the filaments 34 and 43. The transformer 126 is adjusted to produce a predetermined reading on the meter 125 that is maintained constant throughout the calibration and test runs described below.

A pump switch 136 is then closed to turn on the pump 32 and a pump indicator light 138. Air will then flow through the orifice 66, the controller 24, the flow rate meter 25, the measuring chamber 26, the valve 28, the flow smoothing chamber 30 and the pump 32, returning to the atmosphere.

The instrument is preferably operated in the foregoing manner for about ten or fifteen minutes by which time a temperature equilibrium is achieved within the chambers 26 and 42. This stabilizes the temperature of the filament 34 as indicated by the stabilization of the reading on the voltmeter 58, now connected through the contacts T1.

At the same time, the temperature within the sample chamber 15 will have become stabilized as indicated by the opening of the thermostat switch 38, which extinguishes the lamp 134 at the appropriate temperature setting below the flash point of the volatiles to be tested.

The valve 28 is adjusted under the foregoing conditions until the flow rate meter 25 reaches a predetermined reading indicative of a predetermined preliminary flow rate which is maintained substantially constant throughout the calibration and test runs described below. For example, a rate of about 3,000 cubic centimeters of air per minute may be used. It will be understood that this rate of flow is a matter of choice in design, and is determined largely by the desired size and shape of the area A under the curve 64, the purpose generally being to facilitate accurate and rapid measurements of this area by conventional means such as a planimeter.

The next step is to balance the bridge circuit by adjusting the resistance 50 until the voltmeter 58 reads zero volts. This balance is achieved when the ratio of the resistances of the filaments 43 and 34 equals the ratio of the resistance 44 to the combined resistance comprising the resistances 46, 48 and 50.

The instrument is now in condition for either a calibration run or a test run. To permit the proper interpretation of test results, it is desirable to calibrate the instrument by measurement of an accurately known volume of solvent. A convenient method is as follows. A measured quantity of solvent, preferably approximately the same volume expected to be found in a typical sample, is injected by means of a calibrated syringe into the chamber with the cover 76 temporarily removed and replaced by a rubber stopper having a small hole through it to receive the syringe, the hole being quickly closed by means of a finger. Since the chamber is heated the solvent generally vaporizes within a few seconds. Since the valve 22 is now closed the vapor is confined within the sample chamber.

The "test-balance" control button 70 is now closed and held depressed, thereby energizing the valve solenoid 68 and connecting the flow circuit with the measuring chamber. The flow is maintained with the aid of the pressure controller close to but not exceeding the preliminary value while the finger is removed from the stopper.

Substantially all of the volatiles within the chamber 15 are quickly vaporized and conducted in an air stream over the filament 34. This flow continues until substantially all of the volatiles have been exhausted by the pump 32 and the curve 64 has returned to a stable value. Simultaneously, the voltmeter 58 will have attained a steady reading corresponding to the area A under the curve, through operation of the integrating circuit 57 to which it is now connected. In a typical run, for example, this may require about three minutes. The button 70 is then released.

During the foregoing calibration run the resistance of the filament 34 increases to a maximum value and then gradually decreases to its original value, temporarily unbalancing the bridge 40 and producing a reading on the meter 58. The recorder 55 plots the voltage change against time as previously described. The chart factor which equals the ratio of the volume injected by the syringe to the area A is then calculated. In a typical example the factor may equal 10 microliters per square inch.

When the voltage curve 64 has again reached a stable value, a test run may be commenced. The rubber stopper is removed. Sheet material containing an unknown volume of volatiles, and being of predetermined dimensions, is inserted within the sample chamber 15, and the cover 76 with the check valve 19 are replaced.

The test run is then commenced and carried out in the same manner described above for a calibration run, by closure of the button 70 and operation of the valve 22, maintaining the constant flow rate through the meter 25 until a test curve has been completed. The area under the resulting test curve may then be multiplied by the above-mentioned chart factor calculated after the calibration run, thus obtaining the volume of the volatiles in the sample 12 measured in microliters.

It will be appreciated that various refinements in the instrument described are included to increase its sensitivity and range of effective operation. For example, the amplifier 56 preferably has a plurality of sensitivity ranges, the appropriate range being determined by observing the shape and size of the curve 64 produced by the test measurements. Acceptable results for production control purposes are obtained, for example, when the area A is in the neighborhood of one-half square inch.

Other adaptations of the instrument, and certain modifications and arrangements of the parts will also become apparent to one skilled in this art, and they are also considered to fall within the spirit and scope of the appended claims.

What is claimed is:

1. A method of measuring the quantity of combustible volatiles in a sample, including the steps of
heating the sample within a chamber to evaporate the volatiles while confining them,
conducting atmospheric air through an opening outside the chamber and over a heated element at an accurately controlled, substantially constant rate while the volatiles are confined,
closing said opening and admitting atmospheric air to the chamber to sweep the volatiles therefrom in an air stream over said element while maintaining said rate substantially constant, said element being heated to a temperature sufficient to burn the volatiles,
and measuring and recording against time function of the elevation in temperature of said element caused by the burning of the volatiles.

2. An instrument for measuring the quantity of combustible volatiles in a sample, said instrument having, in combination,
a sample capsule having a sample chamber for holding the sample, means for admitting atmospheric air thereto and means for preventing the flow of said volatiles to the atmosphere therefrom,
means to heat the sample chamber to a temperature sufficient to evaporate the volatiles in the example,
a valve,
a measuring chamber having a heated element and means to heat said element to a temperature above the flash point of said volatiles,
the valve having an outlet to the measuring chamber, inlets to the sample chamber and the atmosphere, respectively, and means for connecting the inlets selectively to the outlet,
a pump having provision to produce a steady flow of gas,
means defining a confined flow path for air admitted to the sample chamber and entraining the evaporated volatiles, said path connecting the sample chamber to the measuring chamber through said valve,
means producing a signal corresponding to the variations in the temperature of the heated element caused by the burning of the volatiles thereon,
and means to measure and record said signal against time.

References Cited

UNITED STATES PATENTS 2,429,555    10/1947    Langford et al.    73—27
2,715,450    8/1955    Bliss et al.    73—27

(Other references on following page)

UNITED STATES PATENTS

| | | | |
|---|---|---|---|
| 2,857,251 | 10/1958 | Krogh | 73—27 |
| 3,060,723 | 10/1962 | Kapff et al. | 73—19 |
| 3,176,500 | 4/1965 | Coe | 73—27 |
| 3,228,230 | 1/1966 | Thiele | 73—27 |
| 3,240,068 | 3/1966 | Horeth et al. | 73—19 |
| 3,311,455 | 3/1967 | Robinson | 73—27 |

OTHER REFERENCES

"Exaust Gas Analysis Promotes Gasoline Engine Efficency," by L. T. White; Instruments, pp. 64–66, vol. 7, April 1934.

RICHARD L. QUEISSER, Primary Examiner

E. J. KOCH, Assistant Examiner